Patented Sept. 12, 1933

1,926,740

UNITED STATES PATENT OFFICE 1,926,740

METHOD OF ACCELERATING THE VULCANIZATION OF RUBBER AND PRODUCT THEREOF

William J. Clapson and John R. Sheppard, Joplin, Mo., assignors to The Eagle-Picher Lead Company, Cincinnati, Ohio, a corporation of Ohio No Drawing. Application September 8, 1932
Serial No. 632,187

15 Claims. (Cl. 18—53)

Our invention relates to a method of vulcanizing rubber and rubber-like compositions, and it is particularly directed to a novel method of accelerating the vulcanizing process.

The particular object of our invention relates to an improvement in the method of vulcanizing rubber and rubber-like compositions with thiazyl-disulphides and thiazyl-disulphide-polysulphides, as benzo-thiazyl-disulphide or benzo-thiazyl-disulphide-polysulphide, through the use of basic carbonate white lead as the activator for the accelerator.

It has heretofore been shown that certain thiazole compounds provide efficient accelerators for the vulcanization of rubber. A generic class of chemical compounds embodying a thiazole group as part of their structure is disclosed in U. S. Patent 1,544,687. These compounds, particularly those having a mercapto group joined to the thiazole ring, indicated under approved nomenclature as 2-mercapto-thiazole, have been found to be excellent accelerators. Structurally the group is written:

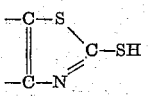

A specific compound of this class is 2-mercapto-benzo-thiazole:

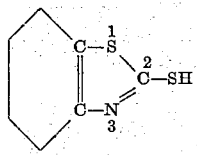

which may be regarded as a species of the subgeneric class of thiazoles designated as mercapto-aryl-thiazoles. As disclosed in U. S. Patent 1,544,687, when mercapto-benzo-thiazole is treated with an excess of sulphur it is oxidized to form benzo-thiazyl-disulphide,

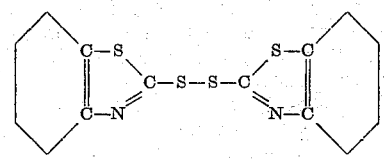

which in turn takes on sulphur to form polysulphides, the probable formula of which is as follows:

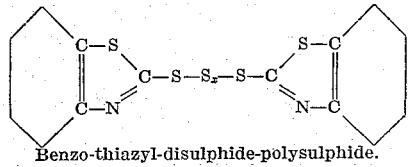

Benzo-thiazyl-disulphide-polysulphide.

The free mercaptan, its disulphide or disulphide-polysulphide are all desirable accelerators for the vulcanization of rubber by sulphur.

Now it has long been known to those familiar with the art that to obtain the advantages of these mercapto-thiazoles, their disulphides or polysulphides, as accelerators of the vulcanization of rubber certain materials commonly called "activators", as for example, metallic oxides or other metallic compounds such as salts of resin or fatty acids, must be present in the rubber mixture. The material most commonly used is zinc oxide; to a lesser extent litharge (lead mon-oxide) has been employed. It is also well-known that when litharge is used as the activator of a mercapto-thiazole, such as mercapto-benzo-thiazole, or its disulphide, as benzo-thiazyl-disulphide, the rubber mixture vulcanizes much faster, and at a lower temperature, than when zinc oxide is the activator; in many mixtures, such as those containing large amounts of carbon black, the physical properties of the vulcanized product are superior to those obtained when zinc oxide is used as the activator. Because of the faster cure of benzo-thiazyl-disulphide with litharge than with zinc oxide the quantity of benzo-thiazyl-disulphide may be greatly reduced when litharge is the activator, or the time of cure shortened. In many cases reduction of the quantity of benzo-thiazyl-disulphide, to maintain a curing time similar to that required with the zinc oxide mixture, results in a cheaper mixture, and this circumstance together with the enhanced physical properties conferred by litharge activation, make the use of the latter very desirable. However, when using such a litharge stock, even with the decreased amount of benzo-thiazyl-disulphide, vulcanization of the rubber mixture may, under some conditions, begin at some undesirable point during processing and "scorching" is then said to have occurred. By our present invention it is disclosed how the desirable features of the rubber mixture accelerated with litharge-activated thiazyl-disulphides may be retained and the disadvantages of scorching substantially removed.

To illustrate the curing and scorching properties of rubber mixtures using basic carbonate white lead, litharge, and zinc oxide with benzothiazyl-disulphide, the following example is given. The results quoted are typical of many others we have obtained using various base formulas. As to the actual figures obtained it will be understood by those familiar with the art that the relative values obtained rather than the absolute values constitute the comparison: tests conducted from laboratory to laboratory will give somewhat different absolute values.

The tendency to "scorch" was estimated as follows: small, equal-sized portions of the mixed stocks were heated at 212° F. for specified periods, cooled, placed in high-test gasoline, and the tendency to disperse observed. Least tendency to scorch coincides with greatest tendency to disperse. In the following tables lowest scorching tendency (i. e. the most desirable tendency) is denoted by lowest number.

*Examples*

|  | Zinc oxide stock | Litharge stock | Basic lead carbonate stock |
|---|---|---|---|
| Smoked sheets | 100 | 100 | 100 |
| Sulphur | 2.9 | 3.2 | 3.2 |
| Benzo-thiazyl-disulphide | 1.4 | 0.5 | 0.5 |
| Litharge |  | 8 |  |
| Basic carbonate white lead |  |  | 8 |
| Zinc oxide | 5 |  |  |
| Gas black | 45 | 45 | 45 |
| Pine tar | 3 | 3 | 3 |
| Stearic acid | 4 | 4 | 4 |

*Curing test at 266° F.*

| Cure | Tensile lbs./in.² | Elongation % | Tensile lbs./in.² | Elongation % | Tensile lbs./in.² | Elongation % |
|---|---|---|---|---|---|---|
| 15' | Slight cure. |  | 4060 | 700 | 4080 | 675 |
| 30' | 3700 | 660 | 4570 | 675 | 4260 | 650 |
| 60' | 4000 | 600 | 4350 | 580 | 4400 | 600 |
| 90' | 4350 | 600 | 4605 | 585 | 4420 | 565 |
| 120' | 4180 | 515 | 4320 | 585 | 4260 | 545 |

*Curing test at 274° F.*

| Cure | Tensile lbs./in.² | Elongation % | Tensile lbs./in.² | Elongation % | Tensile lbs./in.² | Elongation % |
|---|---|---|---|---|---|---|
| 5' | Porous. |  | 2660 | 680 | 1980 | 690 |
| 10' | Porous. |  | 3810 | 680 | 3850 | 720 |
| 20' | 3080 | 650 | 4345 | 665 | 4270 | 690 |
| 60' | 4200 | 560 | 4220 | 550 | 4150 | 540 |
| 90' | 3835 | 485 | 4060 | 540 | 4100 | 535 |

*Scorch test at 212° F.—Lowest number indicates least scorching tendency*

| | | | |
|---|---|---|---|
| Heated ¼ hour | 1 | 2 | 1–2 |
| Heated ½ hour | 2 | 4–5 | 2–3 |
| Heated ¾ hour | 2–3 | 5 | 3 |
| Heated 1 hour | 3 | 5 | 3–4 |
| Heated 1½ hours | 4–5 | 5 | 4–5 |

The above data show: (a) that the litharge stock is distinctly more scorchy than the zinc oxide stock but that the basic lead carbonate stock is not nearly as scorchy as the litharge stock and is in fact nearly on a par with the zinc oxide stock in this respect; (b) that both the litharge and the carbonate stocks are superior to the zinc oxide stock in properties of the vulcanizate ("curing test") and that this holds even though only 0.5% benzo-thiazyl-disulphide had been used with the lead-activated stocks as against 1.4% benzo-thiazyl-disulphide with the zinc oxide stock.

The zinc oxide formula above is similar to many now being successfully processed in rubber factories and the scorching tests show a substantial equality in freedom of scorching as between the basic lead carbonate stock and the zinc oxide stock. On the other hand, rubber factory experience confirms the less satisfactory character of the litharge stock as regards scorching.

What we claim is:

1. An improvement on the method of accelerating the vulcanization of rubber with a material embodying the following organic structure,

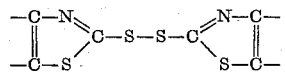

which comprises employing basic carbonate white lead as activator.

2. An improvement on the method of accelerating the vulcanization of caoutchouc in the presence of a thiazyl-disulphide, or derivative thereof, which comprises employing basic carbonate white lead as activator.

3. An improvement on the method of accelerating the vulcanization of caoutchouc in the presence of an aryl-thiazyl-disulphide or derivative thereof, which comprises employing basic carbonate white lead as activator.

4. An improvement on the method of accelerating the vulcanization of caoutchouc in the presence of benzo-thiazyl-disulphide or derivative thereof, which comprises employing basic carbonate white lead as activator.

5. An improvement on the method of accelerating the vulcanization of caoutchouc in the presence of benzo-thiazyl-disulphide-polysulphide which comprises employing basic carbonate white lead as activator.

6. A method of accelerating the vulcanization of caoutchouc that comprises vulcanizing the same in the presence of basic carbonate white lead and a material embodying the following organic structure:

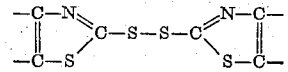

7. A method of accelerating the vulcanization of caoutchouc that comprises vulcanizing the same in the presence of basic carbonate white lead and a thiazyl-disulphide or derivative thereof.

8. A method of accelerating the vulcanization of caoutchouc that comprises vulcanizing the same in the presence of basic carbonate white lead and an aryl-thiazyl-disulphide, or a derivative thereof.

9. A method of accelerating the vulcanization of caoutchouc that comprises vulcanizing the same in the presence of basic carbonate white lead together with benzo-thiazyl-disulphide.

10. A method of accelerating the vulcanization of caoutchouc that comprises vulcanizing the same in the presence of basic carbonate white lead together with benzo-thiazyl-disulphide-polysulphide.

11. A caoutchouc product which has been vulcanized in the presence of basic carbonate white lead and a material embodying the following organic structure:

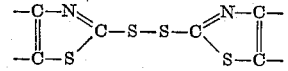

12. A caoutchouc product which has been vulcanized in the presence of basic carbonate white lead and a thiazyl-disulphide or a derivative thereof.

13. A caoutchouc product which has been vulcanized in the presence of basic carbonate white lead and an aryl-thiazyl-disulphide or a derivative thereof.

14. A caoutchouc product which has been vulcanized in the presence of basic carbonate white lead and benzo-thiazyl-disulphide.

15. A caoutchouc product which has been vulcanized in the presence of basic carbonate white lead and benzo-thiazyl-disulphide-polysulphide.

WILLIAM J. CLAPSON.
JOHN R. SHEPPARD.